Oct. 15, 1946.  W. M. PATIENCE ET AL  2,409,513
LOADING AND UNLOADING MACHINE
Filed March 27, 1944  3 Sheets-Sheet 1
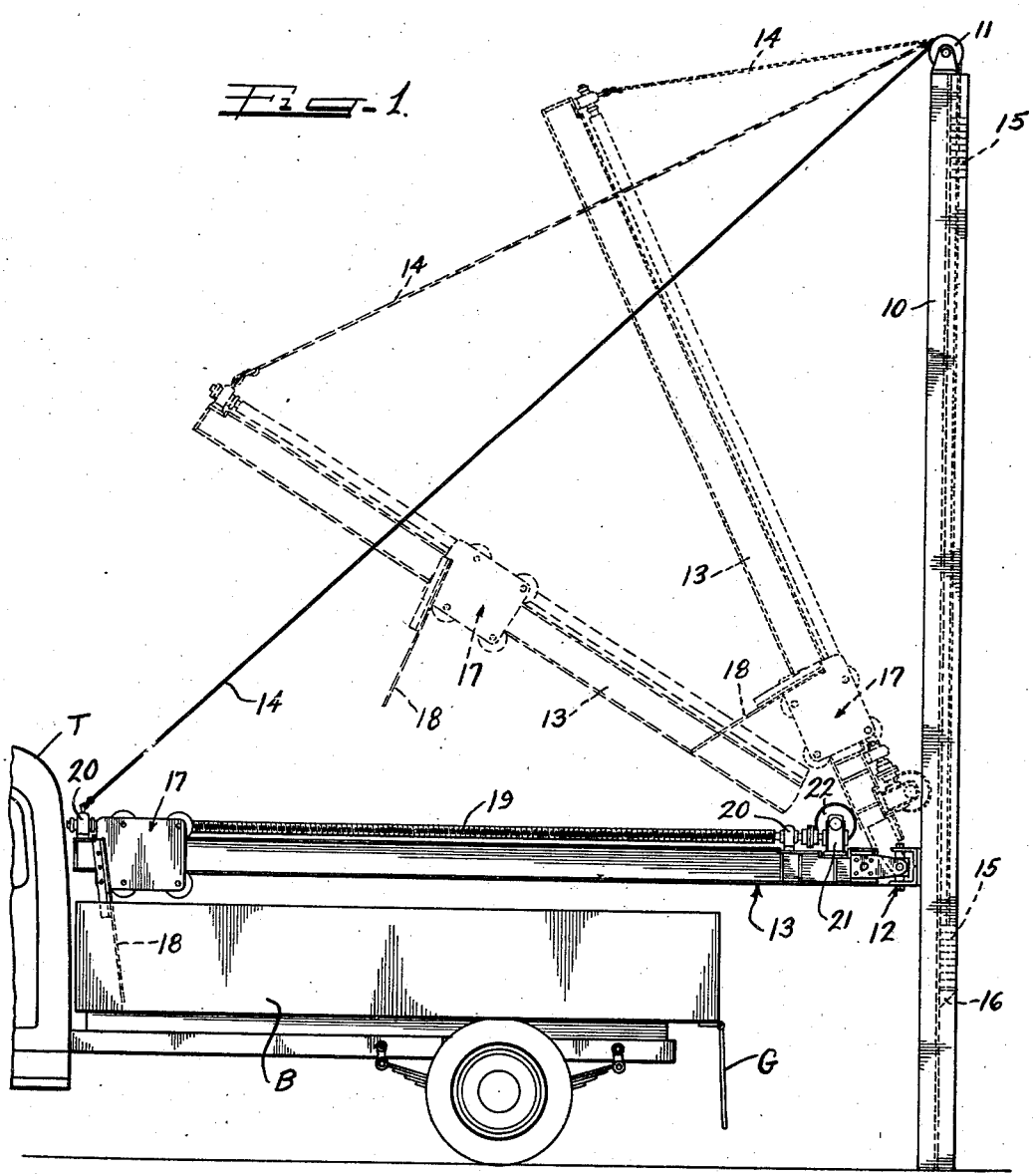
Inventors
WILLIAM M. PATIENCE.
DONALD E. KIMBALL, II.

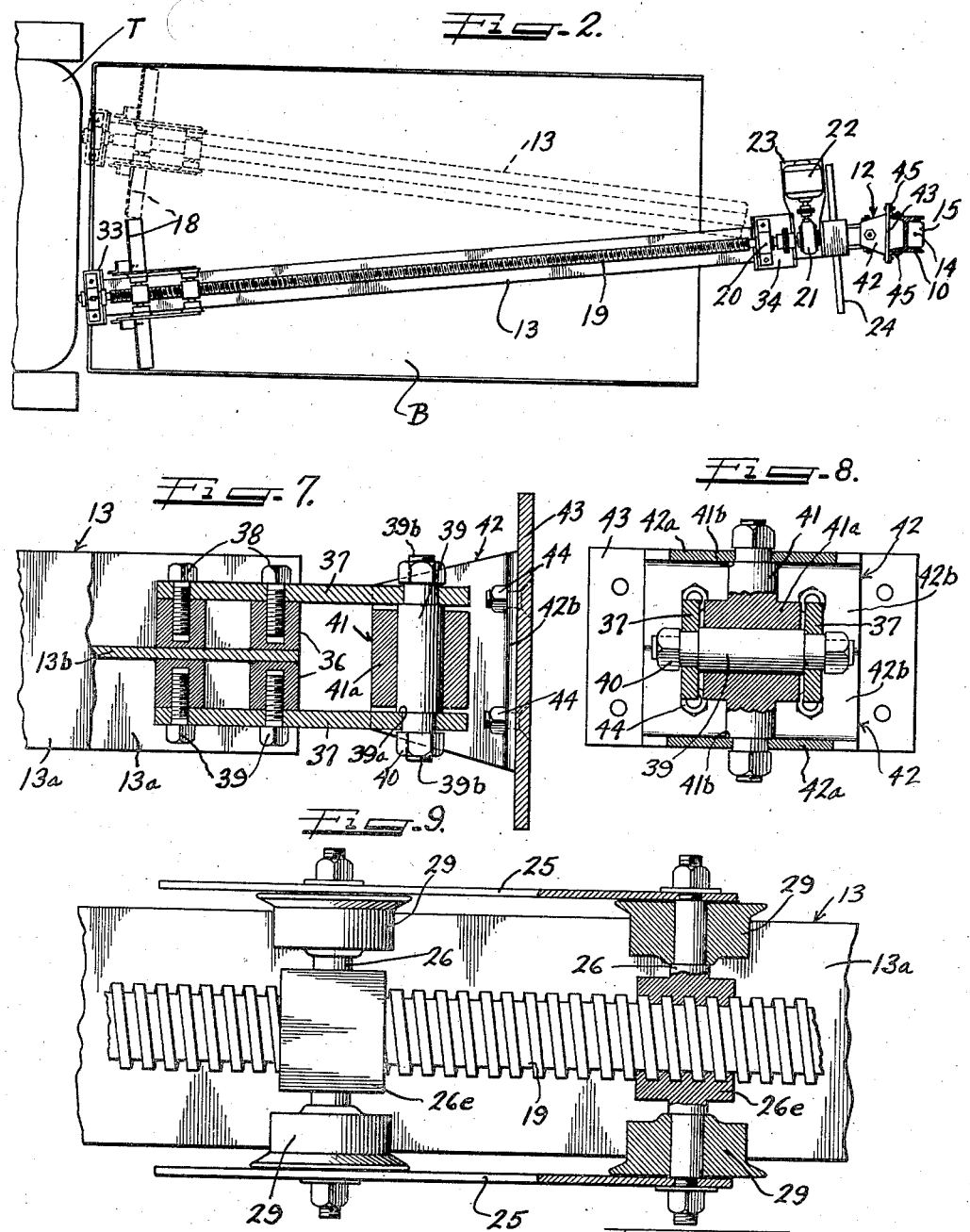

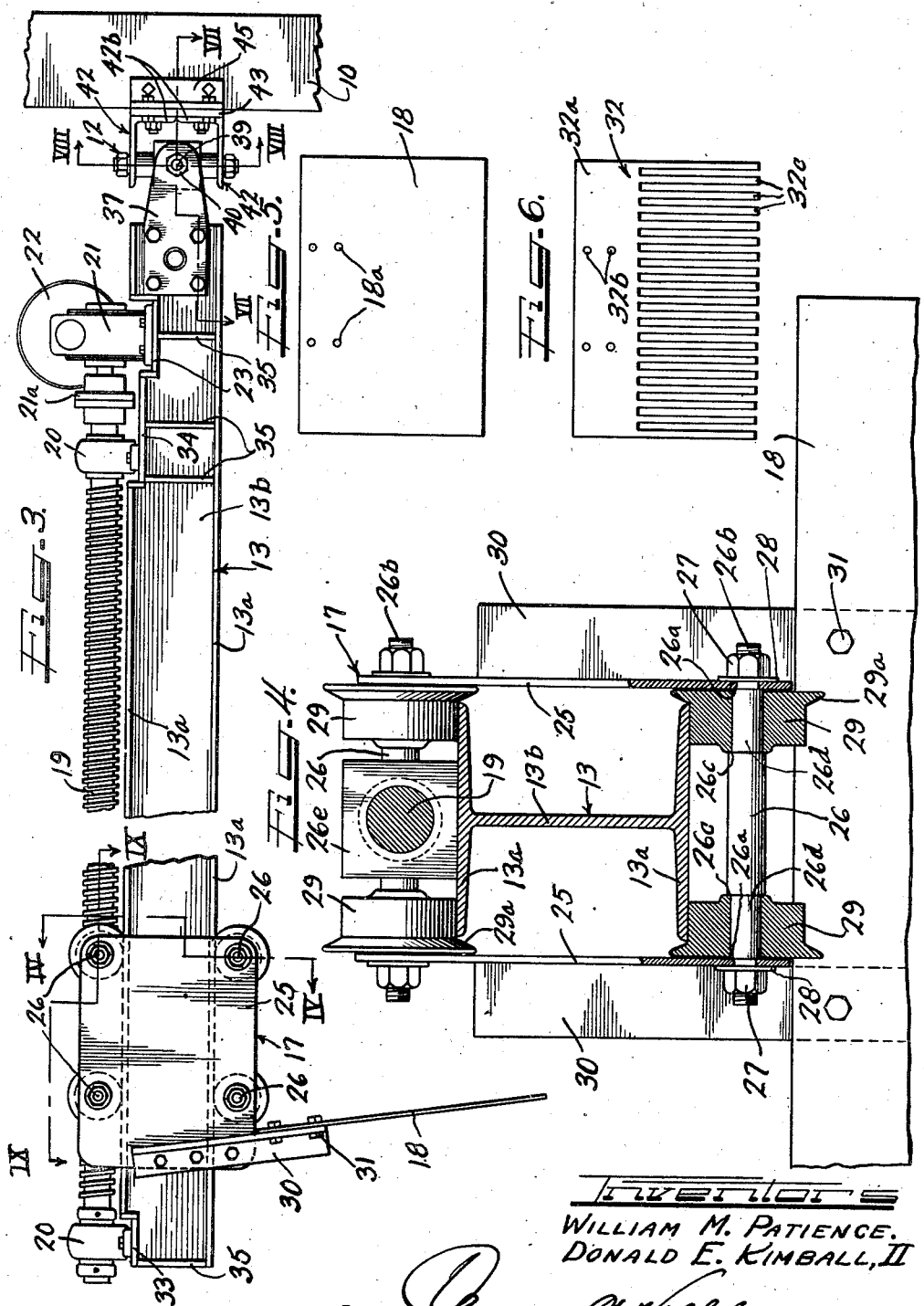

Patented Oct. 15, 1946

2,409,513

UNITED STATES PATENT OFFICE 2,409,513

LOADING AND UNLOADING MACHINE

William M. Patience and Donald E. Kimball, II, Chicago, Ill., assignors to Darling & Company, Chicago, Ill., a corporation of Illinois Application March 27, 1944, Serial No. 528,216

5 Claims. (Cl. 198—222)

This invention relates to a device for controlling, from a remote point, the movement of masses of material, such as, for example, the unloading from trucks of scraps, garbage, bones and the like.

Specifically, the invention relates to a loading and unloading machine having a positively driven blade or shovel mounted on a swingable arm for guiding the blade or shovel from a remote point.

The invention will hereinafter be described as embodied in a loading or unloading machine for trucks, but it should be understood that the principles of the invention are broadly applicable to material-moving apparatus.

The machines of this invention include positively propelled blades or shovels mounted for movement along the length of guide arms to act on masses of material in paths controlled by an operator from a point remote from the material. For example, the loading and unloading machines of this invention are adapted to be mounted for universal movement on a supporting post or other support and project along the length of a truck body to guide the shovel or blade through a mass of material in the truck body and pull this material out of the end of the truck.

The unloading of garbage, packing house waste, bones and the like from trucks is a messy, difficult job because the trucks are usually not equipped with dump bodies, due to the fact that dump bodied trucks are too high to be conveniently loaded from the street level. Therefore, the collection trucks generally have stationary boxes or bodies about twelve feet long and about two feet deep with tail gates at the rear end thereof adapted to be dropped for discharge of the load. It has heretofore been necessary to have laborers shovel the load out of the rear end of the truck body and, when the load is composed of scraps from restaurants, butcher shops, and packing houses adapted to be rendered for the production of greases and tallows, such manual unloading is laborious and very distasteful. The machines of the present invention eliminate the necessity for an operator to have physical contact with the load since the shovels automatically pull the load out of the rear end of the truck body and are guided from a point remote from the load.

It is, then, an important feature of the invention to provide a machine for unloading masses of material without exposing an operator to physical contact with the material.

A still further object of the invention is to provide an unloader having a positively driven shovel mounted for movement along the length of an arm which is readily swingable to guide the shovel along a desired path.

A still further object of the invention is to provide a counterbalanced beam carrying a positively driven shovel along the length thereof which automatically lowers the arm as it approaches the outer end of the arm.

A still further object of the invention is to provide a simple and inexpensive truck-unloading device wherein a screw rod positively propels a shovel in both directions along the length of an elongated arm or beam.

Other and further objects of the invention will become apparent to those skilled in the art from the following detailed description of the annexed sheets of drawings which, by way of preferred example only, illustrate one embodiment of the invention.

On the drawings:

Figure 1 is a side elevational view of an unloader according to this invention illustrating the manner in which a truck body is unloaded and also showing, in dotted lines, several positions of the unloader arm.

Figure 2 is a top plan view of the machine of Figure 1 illustrating the manner in which the control arm can be laterally shifted relative to the truck body being unloaded.

Figure 3 is a broken fragmentary side elevational view of the unloader machine.

Figure 4 is an enlarged transverse cross-sectional view taken along the line IV—IV of Figure 3.

Figure 5 is a face view of one form of shovel for the unloader machine of this invention.

Figure 6 is a face view of a forked type of shovel for the machine of this invention.

Figure 7 is an enlarged horizontal cross-sectional view taken along the line VII—VII of Figure 3.

Figure 8 is an enlarged vertical cross-sectional view taken along the line VIII—VIII of Figure 3.

Figure 9 is an enlarged fragmentary plan view, with parts in horizontal cross section, taken along the line IX—IX of Figure 3.

As shown on the drawings:

In Figures 1 and 2, a truck T having an open-topped rectangular box body B with a tail gate G is illustrative of a type of vehicle that is conveniently unloaded by the unloading machine of this invention. This machine includes a rigid vertical I-beam 10 fixedly mounted at its lower end and carrying a pulley 11 at its upper end. This I-beam 10 is merely illustrative of a support for the unloading arm of the machine of this invention, and could be replaced with other fixed structure such as a part of an unloading platform, building, or the like. Also, the support could be mounted on a movable carriage or dolly.

The beam 10 carries a universal joint indicated generally at 12 at a level somewhat above the top of the truck body B. An I-beam arm 13 has one end thereof mounted on this universal joint 12 and has the other end thereof connected to a cable 14 trained over the pulley 11 to carry counterweights 15 which are ridable in the rear face of the I-beam 10. A stop 16 for the counterweights is provided on the beam 10 to prevent the weights from dropping below a desired level so that the beam 13 will not be raised beyond the steep incline illustrated in Figure 1 by the counterweights.

A carriage 17 rides along the length of the arm 13 and carries a shovel or scraper blade 18 projecting into the truck body B to act on the material therein. A screw rod 19 is rotatably mounted in bearings 20 carried by the arm 13 and extends along the length of the arm to positively drive the carriage 17 in both directions along the length of the arm. A speed reducer 21 is mounted on the arm 13 at the end thereof adjacent the universal joint 12 and an electric motor 22 mounted on a platform 23 carried by the arm 21, as will be more fully hereinafter described, drives the speed reducer 21 to rotate the screw rod 19.

As illustrated in Figure 1, the counterbalancing of the arm 13 by the weights 15 is arranged so that the weights 15 will pull the arm 13 into the illustrated steeply inclined position when the carriage is at the end of the arm adjacent the universal joint. However, when the carriage and blade assembly is moved toward the free end of the arm 13 away from the universal joint, its weight will be sufficient to overbalance the counterweights 15 and cause the arm to swing downwardly into the horizontal position shown in solid lines.

The motor 22 is operated so as to drive the screw rod 19 for pulling the carriage 17 and blade 18 toward the rear end of the box B for discharging the mass of material in the box out through the open end. As shown in Figure 2, a handle 24 is provided on the arm 13 near the universal joint 12 for swinging the arm in a horizontal plane to position the blade or shovel 18 as desired in the box B of the truck. The arm 13 is thus readily swung from a point remote from the material being unloaded to guide the blade through the material.

The blade 18 is preferably inclined as illustrated in Figures 1 and 3 to have the bottom edge forward from the top of the material pushed thereby so that the material will rest on the blade and tend to force the bottom edge against the bottom of the truck box B. After the blade 18 has been moved out of the open rear end of the truck box B, the load, of course, is released from the blade 18 and the counterweights 15 will be effective to raise the arm 13 to the steep inclined position shown in Figure 1. The motor 22 is then reversed to move the carriage 17 toward the other end of the arm 13 and the arm will be automatically lowered back to the horizontal position as the carriage reaches the end of the arm. Thus, the position of the carriage on the arm controls the position of the arm and automatically moves the blade into position for the next unloading stroke through the truck body.

As best shown in Figures 3 and 4, the carriage 17 includes side plates 25, 25 held in spaced apart relation by four bolts 26, each of which, as shown in the cross-sectional portion of Figure 4, have shoulders 26a abutting the plates 25 and threaded end portions 26b receiving nuts 27 thereon to clamp the plates between the shoulders 26a and washers 28.

The bolts 26 have additional shoulders 26c thereon inwardly from the shoulders 26a to provide reduced-diameter end portions 26d forming axles for rollers 29. The rollers 29 ride on the flanges 13a, 13a of the I-beam arm 13 and have flanged edges 29a overlying the flanges 13a to maintain the plates 25 always free from rubbing contact with the arm 13. The rollers 29 abut the shoulders 26c of the bolts 26.

As best shown in Figures 4 and 9, the bolts 26 carrying the top rollers 29 have central internally threaded integral boss portions 26e receiving the screw rod 19 in threaded relation therethrough.

Each plate 25, as shown in Figures 3 and 4, has an angle bar 30 bolted thereon near the front ends thereof and depending beneath the bottom of the carriage to receive the shovel or scraper plate 18 thereagainst. Bolts 31 removably secure this plate 18 to the angle bars. As shown in Figure 5, the plate 18 is a rectangular metal piece with bolt holes 18a therein for receiving the bolts 31. The plate 18 can be of any suitable size but for truck bodies having side walls about two feet high and six feet wide, the plate is preferably about three feet long and somewhat over two feet high, in the order of two and one-quarter to two and one-half feet.

As shown in Figure 6, a fork-type plate or shovel 32 can be used. This plate 32 has a solid top portion 32a containing bolt holes 32b and a plurality of tines 32c depending from the top portion 32a thereof. This type of shovel or fork blade is especially suitable for unloading materials such as bones and the like.

The I-beam arm 13, as indicated in Figure 3, has the top flange 13a cut off at the end of the arm and the web 13b of the arm supports a cross plate 33 carrying the bearing 20. A similar cross plate 34 is provided on the arm near the other end thereof to support the other bearing 20. Vertical plates such as 35 are provided to rigidify the plates 33 and 34. These plates or ribs can be welded to the web 13b of the arm.

The supporting plate 23 carrying the motor 22 and speed reducer 21 is likewise secured to a cut-out portion of the arm 13 and welded to the web 13b thereof while rigidifying ribs such as 35 additionally carry the plate 23. A coupling 21a joins the speed reducer 21 with the screw rod 19.

As best shown in Figures 3 and 7, the inner end of the arm 13 adjacent the universal joint 12 has blocks 36 welded to opposite faces of the web 13b between the flanges 13a and plates 37 are bolted to these blocks 36 by means of bolts 38. The plates 37 project from the end of the arm 13 in spaced opposed relation and a pin 39 extends across the space between the plates and has shoulders 39a abutting the inner faces of the plates, together with reduced-diameter threaded end portions 39b extending through apertures in the plates and receiving nuts 40 thereon.

The pin 39 extends through the central enlarged portion 41a of a vertical pin 41 and is rotatable relative to this vertical pin.

The vertical pin 41 has shoulders 41b abutting the inner faces of the horizontal legs 42a of angle pieces 42. These angle pieces 42 have vertical legs 42b bolted to a plate 43 by means of nut and bolt assemblies 44.

The plate 43, as best shown in Figure 2, extends across the front face of the I-beam 10 and angle members 45 secure the plate to the I-beam through bolts or the like.

The universal joint 12 therefore includes a vertical pin 41 swivelly mounted between the horizontal legs of angle pieces 42 which are secured on the beam or post 10 together with a horizontal pin 39 swivelly mounted in the vertical pin 41 and secured to rearwardly projecting plates 37 carried by the inner end of the arm 13. The arm 13 can thus be raised and lowered by swiveling of the horizontal pin 39 in the vertical pin 41 as indicated in Figure 1. The arm can also be swung laterally as indicated in Figure 2 by swiveling of the vertical pin 41 between the angle members 42.

The unloading device of this invention operates by driving the motor 22 to move the carriage 17 out toward the free end of the arm 13. As the carriage moves outwardly on the arm, it becomes effective to overbalance the counterweights 16 and cause the arm to assume a horizontal position where the scoop or scraper blade 18 will enter the truck body B to act on material in the body. The motor 22 is then reversed to pull the carriage 17 back toward the inner end of the arm 13. An operator can guide the arm 13 from the handle 24 which is remote from the load, as indicated in Figure 2. The blade 18 is effective to pull the load out of the open rear end of the truck body to dump it out of the truck. When the load has been dumped and the blade relieved of the load, the counterweights can be arranged so that they will automatically again raise the arm 13 to an out of the way position.

If it is desired to use the machine of this invention as a loader, the arm 13 can be held down and the above described operation can be reversed, using the scoop to push material into a truck or other device to be loaded. For example, the scoop can load material from a source such as a pile or bed into the truck body by pushing the material from the source through the open end of the truck into the forward end of the truck body.

From the above descriptions it will be seen that it is not necessary for an operator to have physical contact with the load in using the unloader of this invention, since the unloader is controlled from a point remote from the load.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A device for controlling, from a remote point, the movement of masses of material which comprises a support, an arm swingably mounted on said support, a carriage mounted on said arm for movement along the length of the arm, material-engaging means depending from said carriage, reversible positive propulsion means for driving said carriage in both directions along the length of said arm, and counterbalancing means cooperating with said support for automatically raising said arm when said carriage is moved to a position adjacent said support.

2. An unloader comprising a vertical support, a rigid beam, a universal joint connecting one end of said beam with said support, a cable having one end thereof connected to the other end of said beam, counterweights secured on the other end of said cable acting to raise said beam, a carriage riding on said beam for movement along the length thereof, means for driving said carriage in opposite directions along the length of said beam, and a load-engaging blade depending from said carriage, the counterweights being effective to raise the beam when the carriage is moved adjacent the support, and the weight of the carriage being effective to lower the beam when the carriage is moved outwardly from the support.

3. An unloader comprising a beam, a carriage on said beam, a screw rod, bearings rotatably mounting said screw rod on said beam, an electric motor on said beam coupled to said screw rod to rotate the rod, said carriage having means thereon receiving the screw rod in threaded relation therethrough, a load-engaging plate depending from said carriage along an inclined path to present a leading edge to a load, and counterbalance means for automatically raising said beam away from a load when said leading edge of the plate emerges from the load.

4. An unloader comprising an I-beam having a vertical web and horizontal flanges, spaced plates secured to the web of said beam and projecting therefrom, a first pin bridging said plates, a second pin swivelly receiving the first pin, a support swivelly carrying the second pin, a carriage having opposed rollers riding on the flanges of the beam, a pair of bearings secured on the top flange of the beam near the ends of the beam, a screw rod rotatably mounted in said bearings, an internally threaded member on the carriage receiving the screw rod therethrough in threaded relation, a plate depending from the carriage to engage a load, a motor on the beam drivingly connected to the screw rod, a counterweighted cable for automatically swinging the beam in a vertical plane about said first pin when the screw rod moves the carriage close to the first pin and an arm for swinging the beam in a horizontal plane about said second pin to guide the path of movement of the carriage.

5. An unloader comprising an I-beam having top and bottom flanges, rollers riding on said top and bottom flanges, said rollers having flanges overlying the edges of the top and bottom flanges of the I-beam, plates overlapping said rollers on opposite sides of the beam, axles receiving said rollers carrying said plates to provide a rigid carriage for riding along the length of the beam on the top and bottom flanges thereof, said flanges of the rollers holding said plates in spaced outward relation from the beam and preventing the carriage from cocking, at least one of said axles having an internally threaded boss portion between the rollers thereon, a screw rod extending along the length of the beam and threaded through said boss portion, bearings secured on said beam near the ends thereof rotatably supporting said screw rod, a universal joint support for one end of the beam, means for raising and lowering the other end of the beam, means for laterally swinging the beam, a speed reducing unit mounted on the beam adjacent the universal joint support therefor, a motor mounted on said beam coupled to said unit, a coupling device connecting said unit with said screw rod whereby said motor is adapted to rotate the screw rod for driving the carriage along the length of the beam, and a load-engaging blade depending from said carriage beneath said beam.

WILLIAM M. PATIENCE.
DONALD E. KIMBALL, II.